(12) United States Patent
Murakami et al.

(10) Patent No.: US 6,726,741 B2
(45) Date of Patent: Apr. 27, 2004

(54) ALUMINUM COMPOSITE MATERIAL, ALUMINUM COMPOSITE POWDER AND ITS MANUFACTURING METHOD

(75) Inventors: Kazuo Murakami, Hyogo (JP); Kazumi Ogura, Hyogo (JP); Toyoaki Yasui, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/774,668

(22) Filed: Feb. 1, 2001

(65) Prior Publication Data

US 2002/0021779 A1 Feb. 21, 2002

(30) Foreign Application Priority Data

Jul. 12, 2000 (JP) ........................................ 2000-211887

(51) Int. Cl.$^7$ .................................................. B22F 1/00
(52) U.S. Cl. ........................................... 75/252; 75/351
(58) Field of Search ........................... 75/249, 244, 232, 75/351, 236, 252

(56) References Cited

U.S. PATENT DOCUMENTS

| | | | | |
|---|---|---|---|---|
| 4,213,883 A | * | 7/1980 | Owens ........................ 252/478 |
| 4,557,893 A | * | 12/1985 | Jatkar et al. .................. 419/12 |
| 4,566,989 A | * | 1/1986 | Radford et al. .............. 252/478 |
| 4,605,440 A | | 8/1986 | Halverson et al. ............ 75/238 |
| 4,689,077 A | * | 8/1987 | Chevigne et al. ............. 75/233 |
| 4,826,630 A | * | 5/1989 | Radford et al. .............. 252/478 |
| 4,915,903 A | * | 4/1990 | Brupbacher et al. ........ 148/328 |
| 4,923,532 A | * | 5/1990 | Zedalis et al. ............... 148/514 |
| 5,006,417 A | * | 4/1991 | Jackson et al. .............. 428/614 |
| 5,045,278 A | * | 9/1991 | Das et al. .................... 148/437 |
| 5,333,156 A | | 7/1994 | Lemercier ................... 376/219 |
| 5,561,829 A | * | 10/1996 | Sawtell et al. ................. 419/13 |
| 5,624,475 A | * | 4/1997 | Nadkarni et al. .............. 75/238 |
| 5,700,962 A | * | 12/1997 | Carden ........................ 252/478 |
| 5,942,057 A | * | 8/1999 | Hanamura et al. .......... 148/421 |

FOREIGN PATENT DOCUMENTS

| | | |
|---|---|---|
| CH | 410 436 | 3/1966 |
| DE | 43 08 612 | 9/1994 |
| EP | 0 340 788 | 11/1989 |
| EP | 1 083 240 | 3/2001 |
| JP | 59-96242 | 6/1984 |
| JP | 61-235523 | 10/1986 |
| JP | 1-208446 | 8/1989 |
| JP | 3-82732 | 4/1991 |
| JP | 8-260075 | 10/1996 |
| JP | 10-195567 | 7/1998 |

OTHER PUBLICATIONS

U.S. patent application Ser. No. 09/657,907, filed Sep. 8, 2000, pending.
U.S. patent application Ser. No. 09/827,911, filed Apr. 9, 2001, pending.
U.S. patent application Ser. No. 09/787,912, filed Mar. 30, 2001, pending.
U.S. patent application Ser. No. 09/774,668, filed Feb. 1, 2001, pending.

* cited by examiner

Primary Examiner—Ngoclan Mai
(74) Attorney, Agent, or Firm—Oblon, Spivak, McClelland, Maier & Neustadt, P.C.

(57) ABSTRACT

Aluminum powder, neutron absorber, and third particle composed of oxide, nitride, carbide or boride are mixed, and preformed by cold isostatic pressing (CIP). Successively, by canning the preformed material, this preformed material is sintered by hot isostatic pressing (HIP). After sintering, the can outside and end face are machined by grinding, and the billet is taken out. Square pipes are formed by extruding this billet.

9 Claims, 14 Drawing Sheets

ALUMINUM COMPOSITE MATERIAL, ALUMINUM COMPOSITE POWDER AND ITS MANUFACTURING METHOD

FIELD OF THE INVENTION

The present invention relates to a material to be used in manufacturing a spent fuel storage member comprising a cask or a rack. Such a spent fuel storage member is used for accommodating and storing spent nuclear fuel assembly after burning. This invention also relates to a method of manufacturing such a material and the spent fuel storage member manufactured from such material.

BACKGROUND OF THE INVENTION

The nuclear fuel assembly no longer usable after burning in the final stage of nuclear fuel cycle is called a spent nuclear fuel. This spent nuclear fuel is stored and managed at a storage facility until the time of reprocessing. For example, in the stage method using fuel pool, SUS racks bundling square pipes are submerged in the pool, and spent fuel assemblies are put in the square pipes, so as to satisfy the requirements of cooling effect, shielding effect, and subcriticality.

Recently, boron is often added to stainless steel to manufacture the square pipes that make the racks. Conventionally, a neutron absorber is provided between the square pipes of the racks. However, such a neutron absorber is not required when square pipes made from boron-added-stainless steel are used. Accordingly, gap or distance between adjacent square pipes can be reduced and the number of square pipes that can be inserted in the pool pit can be increased. Resultantly, the storage capacity of spent fuel assemblies can be increased.

Such square pipes may be applied in various storage systems such as cask, horizontal silo, pool, and board. However, even when manufacturing the pipes, for example, for only the racks, the number of pipes to be manufactured is great. Accordingly, a technology with which a large number of square pipes can be efficiently manufactured is in demand. Further, to absorb the neutrons generated from the spent fuel assemblies securely the structure of the square pipes is required to be sturdy.

Beside the racks made from the square pipes, racks made form flat plates are also used to store the spent fuel assemblies. Accordingly, a technology with which a large number of these flat plates can be efficiently manufactured is also in demand. Further, the spent fuel assemblies obtained from the pressurized water reactor (PWR) are heavy. Therefore, the racks that accommodate and store such assemblies are required to be still stronger.

SUMMARY OF THE INVENTION

It is an object of the present invention to provide a material by the use of which stronger spent fuel storage members can be manufactured in large number.

The aluminum composite powder according to one aspect of the present invention is obtained by employing mechanical alloying, and dispersing neutron absorber, and third particle composed of oxide, nitride, carbide or boride ground by mechanical alloying in aluminum matrix.

The neutron absorber dispersed in the aluminum matrix acts to block sipping in the crystal grain boundary, and reinforce the material. The third particle composed of oxide or the like is dispersed in the aluminum matrix, and further promotes the blocking action of slipping of crystal particles, so that the material strength is further heightened. It is preferable that the content of the dispersed third particle is 0.1% by weight or more to 30% by weight or less. Further, it is preferable that the mean particle size of the third particle added in the aluminum matrix is 0.01 $\mu$m or more to 10 $\mu$m or less. Further, it is preferable that, in the aluminum composite powder, the content of the neutron absorber is 1% by weight or more to 20% by weight or less. Further, it is preferable that the mean particle size of the neutron absorber powder to be added is preferred to be 0.01 $\mu$m or more to 100 $\mu$m or less.

The manufacturing method of aluminum composite powder according to another aspect of the present invention comprises the steps of mixing aluminum powder as matrix material, neutron absorber, and third particle composed of oxide, nitride, carbide orboride, and dispersing the ground neutron absorber and third particle in the aluminum matrix by mechanical alloying of the mixed powder.

By mechanical alloying, the aluminum is crushed, plaited and flattened. Besides, the neutron absorber such as B is also finely ground by mechanical alloying, and is uniformly dispersed in the flattened aluminum matrix. Finally, these flat particles are bound to form ordinary particles. As a result, crystal slipping of aluminum is prevented and a sufficient strength is obtained, and in the invention, moreover, the third particle composed of oxide or the like is finely ground, and dispersed in the aluminum matrix. The dispersed third particle is considered to promote the blocking actin of crystal slipping. The aluminum composite powder manufactured in this method comes to have a very large strength.

Further, the steps of forming an oxide film preliminarily on the surface of the aluminum powder, and mixing the oxide film formed on the surface of the aluminum powder as the oxide into the composite powder by mechanical alloying may be added. When using the oxide as the third particle, the oxide is not added separately, but is preliminarily formed as an oxide film on the surface of the aluminum powder, and this oxide film is peeled and ground at the time of mechanical alloying, and is dispersed in the matrix as third particle. Thus, it can save the labor of manufacturing the third particle or the step of adding it, so that the aluminum composite powder can be manufactured easily.

The aluminum composite material according to still another aspect of the present invention is obtained by containing neutron absorber and third element composed of oxide, nitride, carbide or boride, in aluminum matrix. As mentioned above, by dispersing fine neutron absorber and third particle uniformly in the aluminum matrix, they are effective to block aluminum grain boundary slipping and heighten the strength of the material. By sintering such aluminum matrix powder, the neutron absorber and third element are contained in the material, so that the strength may be dramatically improved. The sintering methods include atmospheric sintering, vacuum sintering, discharge sintering, and others, and preforming may be also done before the sintering process. Such aluminum composite material may be used in the basket for containing the spent fuel assemblies. This basket is composed by setting up square pipes or, alternately combining plate members.

In the aluminum composite material, it is preferable that the content of the third particle is 0.1% by weight or more to 30% by weight or less. Further, it is preferable that the mean particle size is 0.01 $\mu$m or more to 10 $\mu$m or less. Further, it is preferable that the content of the neutron absorber is 1% by weight or more to 20% by weight or less. More favorable results will be obtained when the mean particle size of the neutron absorber powder to be added is 0.01 μm or more to 100 μm or less. The reasons of these effects are explained in the following description of the embodiments.

The manufacturing method of spent fuel storage member according to still another aspect of the present invention comprises the steps of mixing aluminum powder, neutron absorber powder, and third element composed of oxide, nitride, carbide or boride, preforming the mixed powder, canning the preformed material, and sintering the canned preformed material.

First, aluminum powder, neutron absorber, and third particle are mixed, and the mixed powder is preformed. By preforming, variance of forming density can be suppressed. Successively, the preformed material is canned, and sintered. Thus are prepared billets before forming the spent fuel storage member. To take out billets from the can, the outside or end of the can is ground. Preferably, the sintering process is done by hot pressing or hot isostatic pressing (HIP) method as a fourteenth aspect. Besides, pseudo-HIP or atmospheric sintering may be also employed. Spent fuel storage members include square pipes for composing basket or plate members for composing flat plate rack.

The manufacturing method of spent fuel storage member according to still another aspect of the present invention comprises the steps of mixing aluminum powder, neutron absorber powder, and third element composed of oxide, nitride, carbide or boride, and atmospheric-sintering or vacuum-sintering the mixed powder.

Thus, the canning step may be omitted and the atmospheric sintering or vacuum sintering may be performed. By omitting the canning step, machining such as grinding of outside is not required after atmospheric sintering or vacuum sintering. Hence, billets can be manufactured easily. Preferably, the sintering process is done by vacuum hot pressing as a sixteenth aspect. Besides, vacuum pseudo-HIP may be also possible. By executing the sintering process by vacuum hot pressing, inexpensive and high-quality spent fuel storage members may be manufactured.

The manufacturing method of spent fuel storage member according to still another aspect of the present invention comprises the steps of mixing aluminum powder and neutron absorber powder, a step of forming a preformed material by cold isostatic pressing, and discharge-sintering the preformed material.

By discharge-sintering the preformed material, sintering can be performed in a shorter time as compared with ordinary sintering. Accordingly, the spent fuel storage members can be manufactured efficiently. Besides, since the canning is omitted, outside grinding or machining is not required, and spent fuel storage members can be manufactured at lower cost. Preferably, the discharge sintering process is done by discharge plasma sintering as an eighteenth aspect. By the energy of discharge plasma sintering, the passive film of aluminum is removed, and favorable sintering is possible. Aside from discharge plasma sintering, heat plasma sintering maybe also applied.

Further, a step of forming a square pipe or a plate material for composing a square pipe by extrusion forming may be added. Also, a step of forming a bar to be inserted into a guide tube of spent fuel by extrusion forming may be added. Thus, in these methods, by extruding the manufactured billets, square pipes or bars can be manufactured easily as the spent fuel storage members as the nineteenth and twentieth aspects. Incidentally, the square pipes may be directly formed by extrusion, or formed by welding after extruding plate members.

Further, the mixing process may be performed by mechanical alloying. The mechanical alloying may be performed using the available boring mills. The particles gradually become flat when the aluminum powder is gradually plaited in the boring mill. The neutron absorber and third particle are ground by the boring mill, and become considerably smaller as compared with the initial mean particle size, and are kneaded and dispersed into the aluminum matrix. After mechanical alloying, the flat particles finally become particles containing the neutron absorber and third particle. Thus, the neutron absorber can be dispersed finely and uniformly, and the mechanical strength of spent fuel storage member can be enhanced.

Other objects and features of this invention will become apparent from the following description with reference to the accompanying drawings.

DESCRIPTION OF THE PREFERRED EMBODIMENTS

Figure 1:
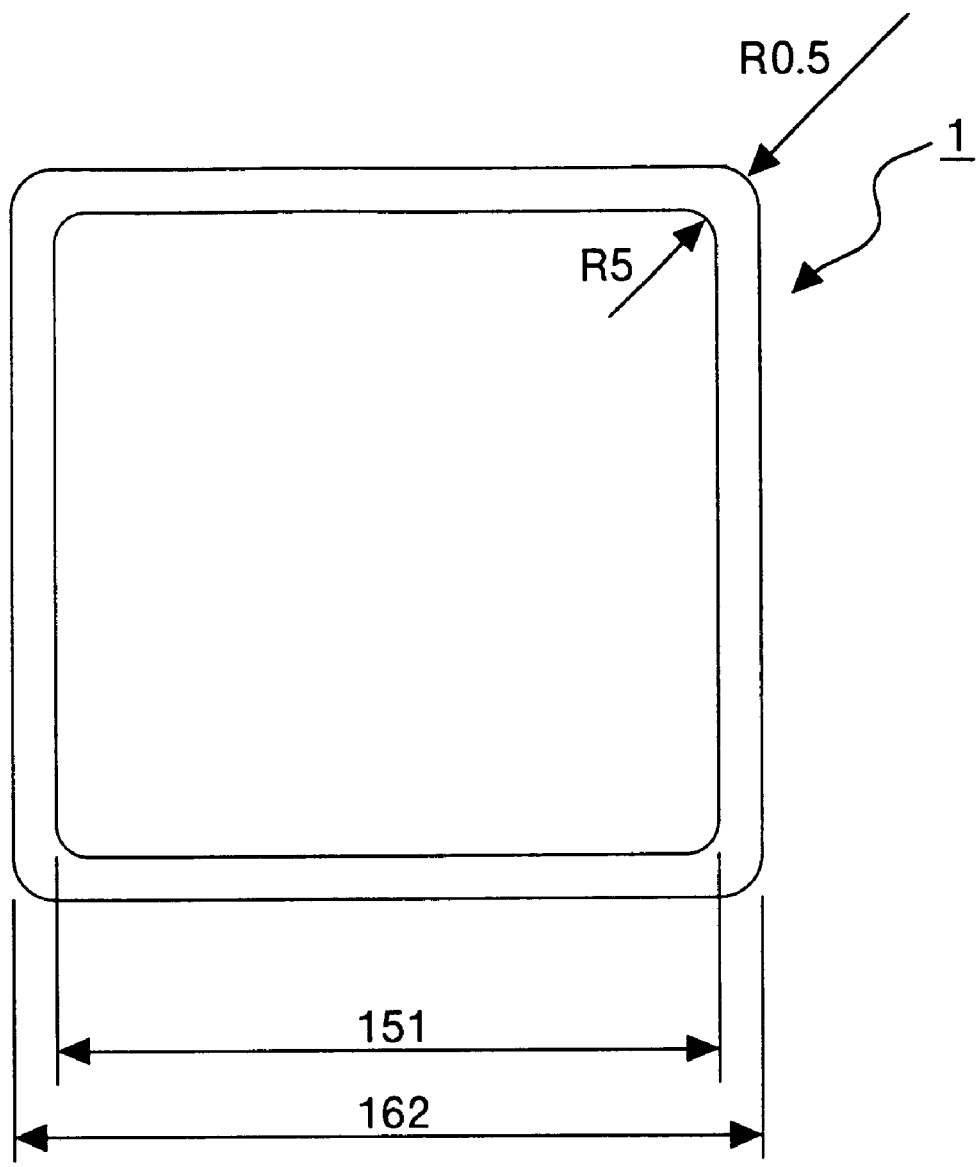
FIG. 1 is a sectional view of a square pipe.

The aluminum composite powder, its manufacturing method, aluminum composite material, spent fuel storage member, and its manufacturing method of the invention are described in detail below by referring to the accompanying drawings. It must be noted, however, that the invention is not limited to the illustrated embodiments alone.

In the aluminum composite material of a first embodiment of the invention, aside from B or B compound, a third particle such as oxide is added, and alloyed mechanically, so that the material strength is enhanced. For this purpose, first, in a container of attriter mill, Al or Al compound powder as matrix material, B or B compound powder as neutron absorber, and third particle containing oxide, nitride, carbide or boride are charged.

The content of the third particle is 0.1% by weight or more to 30% by weight or less. If less than 0.1% by weight, the strength enhancing effect is not obtained, or if more than 30% by weight, the elongation of the manufactured material is lowered. The mean particle size of the third particle in the Al matrix is 0.01 $\mu$m or more to 10 $\mu$m or less. If less than 0.01 $\mu$m, it is very expensive in market and it is hard to obtain in a large quantity. If more than 10 $\mu$m, it hardly contributes to improvement of material strength.

The content of B or B compound is 1% by weight or more to 20% by weight or less. If less than 1% by weight, the neutron absorbing capacity is insufficient, or if more than 20% by weight, the material elongation and toughness are lowered. The mean particle size of B or B compound is 0.01 $\mu$m or more to 100 $\mu$m or less. If less than 0.01 $\mu$m, it is expensive, or if more than 100 $\mu$m, the strength is lowered.

Aside from B or B compound, any element capable of absorbing neutrons can be used, such as Cd, Hf, rare earth element, and other element having a wide neutron absorbing sectional area. For example, in the case of boiling water reactor (BWR), mainly B or B compound is used, but in the case of PWR, on the other hand, Ag—In—Cd alloy is used. The composition of the Ag—In—Cd alloy is generally 15% by weight of In and 5% by weight of Cd. As the rare earth element, oxide of Eu, Sm or Gd may be used.

Examples of oxide used as the third particle include $Al_2O_3$, $ZrO_2$, $SiO_2$, MgO, $TiO_2$, and $Cr_2O_3$. Examples of nitride are $Si_3N_4$ and BN. Examples of carbide are SiC, WC, and $Cr_3C_2$. Examples of boride include $ZrB_2$. The third particle is not limited to these examples, but others may be selected appropriately as required.

Usable examples of Al or Al alloy powder are pure aluminum (JIS 1xxx series), Al—Cu aluminum alloy (JIS 2xxx series), Al—Mg aluminum alloy (JIS 5xxx series), Al—Mg—Si aluminum alloy (JIS 6xxx series), Al—Zn—Mg aluminum alloy (JIS 7xxx series), Al—Fe aluminum alloy (Fe content of 1 to 10% by weight) and Al—Mn aluminum alloy (JIS 3xxx series) which may be selected depending on the required characteristic such as strength, ductility, processability, and heat resistance.

As these examples of Al or Al alloy, quenched and solidified powder having a uniform and fine texture is used. The quenching and solidifying method for obtaining such quenched and solidified powder includes single roll method, twin roll method, atomizing method such as air atomizing method and gas atomizing method, or other known methods. The Al alloy powder obtained by such quenching and solidifying method is preferred to have a mean particle size of 5 to 150 $\mu$m.

More specifically, if the mean particle size is less than 5 $\mu$m, the powder is very fine, and particles aggregate and form a large lump of particles, and yet there is a limit in manufacture by atomizing method (necessary to select and use only fine powder, the powder manufacturing yield is extremely lowered, and the cost is increased), or if the mean particle size exceeds 150 $\mu$m, it is no longer quenching and solidifying, and thus there are problems of limit in manufacture by atomizing method and difficulty in uniform mixing with fine additive particles. The most preferred mean particle size is 50 to 120 $\mu$m. The quenching speed of quenching and solidifying process is $10^{2\circ}$ C./sec or more, preferably $10^{3\circ}$ C./sec or more.

On the other hand, B or B compound to be mixed with Al or Al alloy powder is characterized by a large absorbing capacity of fast neutrons in particular. Preferred B compound usable in the invention included $B_4C$ and $b_2O_3$. In particular, $B_4C$ is preferred as additive particles to structural member because of large content of B compound per unit weight, a large neutron absorbing capacity by a small amount, and very high hardness.

The third particle is thus composed of oxide, nitride, carbide or boride, but may also contain other particles. For example, as additive elements for giving high strength, Zr or Ti may be mixed.

The powder materials thus charged at the specified rate are mechanically alloyed (MA) by an attriter mill. Aside from the attriter mill, general rolling mill or oscillating mill may be used. By MA, the Al powder or Al alloy powder is crushed by the balls, and plaited and flattened. By the MA process, the B or B compound and third particle are finely ground and kneaded uniformly into the Al matrix. After the MA process, these flat particles become ordinary particles containing Al or Al alloy and third particle.

Thus, by adding the third particle and processing by MA, the material strength is dramatically enhanced. Specifically, as compared with the material sintered and formed by mixing by using an ordinary mixing machine (such as cross rotary mixer or V-mixer), it is found that the strength is increased by three times. Besides, since the B or B compound of high hardness is finely and uniformly dispersed in the matrix, aggregation of B is prevented, and hence the extrusion performance is enhanced. It is hence also effective for reducing the wear of the extrusion die.

When adding the third particle, an oxide film may be formed on the surface of the particle by preliminarily oxidizing the Al powder or Al alloy powder, and the oxide film may be finely crushed in the MA process to disperse into the Al matrix. The oxidation process of Al powder or Al alloy powder is realizing by heating the material powder in the atmosphere. That is, the Al powder or Al alloy powder is put in a heating container, and is stirred while heating at 400° C. to 500° C. By continuing this operation for several hours, a sufficient oxide film may be formed on the surface of the Al powder or Al alloy powder.

Figure 2:
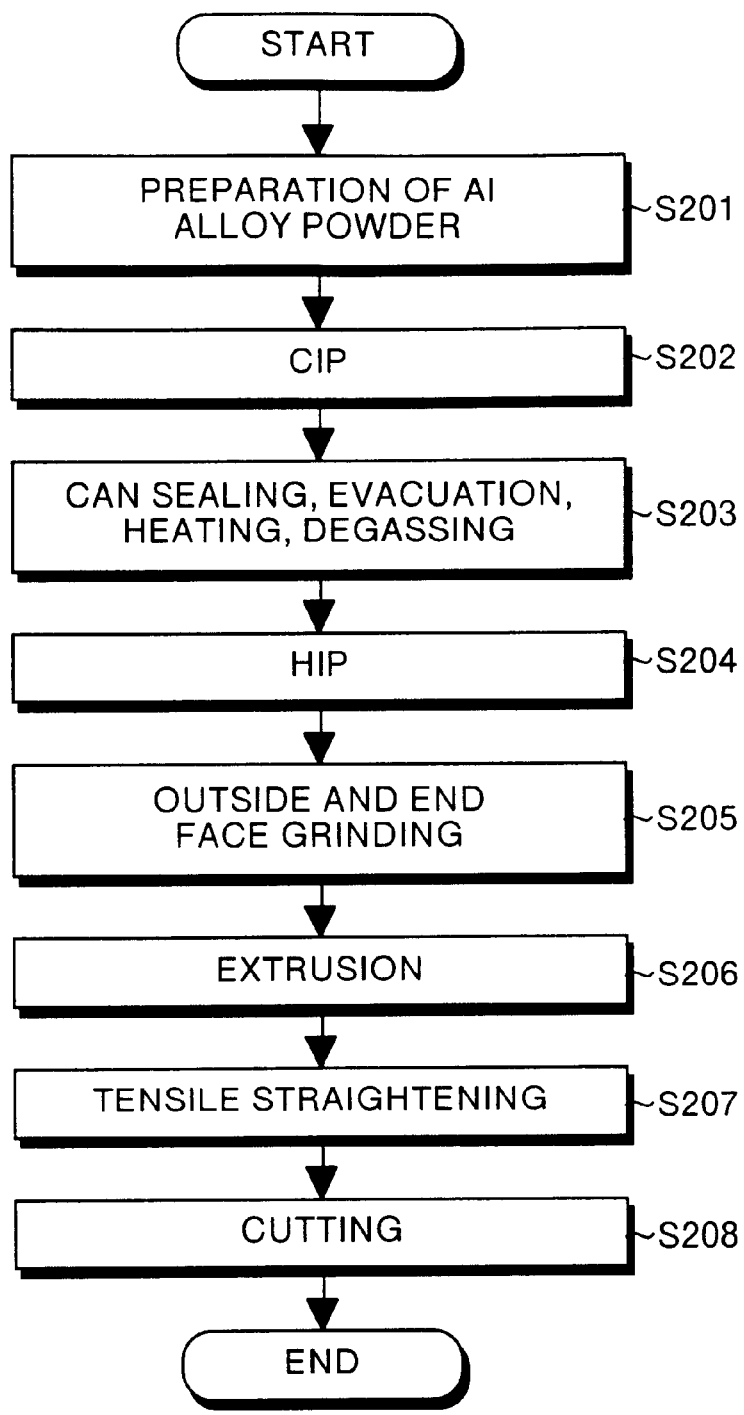
FIG. 2 is a flowchart showing a manufacturing method of square pipe according to a first embodiment of the invention.

FIG. 1 is a sectional view of a square pipe used as a spent fuel storage member. This square pipe 1 has a square section, and is made of the Al alloy manufactured in the first embodiment. FIG. 2 is a flowchart showing a manufacturing method of the square pipe shown in FIG. 1. First, Al alloy powder is formed in the method shown in the first embodiment (step S201).

Next, putting the composite powder in a rubber case, it is evacuated to about $10^{-2}$ Torr, and sealed in vacuum with airtight tape, and a high pressure is applied uniformly from all directions at ordinary temperature by CIP (cold isostatic press) to preform (step S202). The forming pressure of CIP is 100 Mpa to 200 MPa. By CIP process, the volume of the powder is lost by about 20 percent, and the diameter of the preformed material becomes 600 mm, and the length is 1500 mm. By applying pressure uniformly from all directions by the CIP, a formed material of high density small in fluctuation of forming density is obtained.

Successively, the preformed material is sealed in vacuum in an aluminum can (aluminum alloy seamless can: JIS 6063). The can is evacuated to about $10^{-4}$ Torr, and heated to 300° C. (step S203). In this degassing process, gas components and moisture in the can are removed. In the next step, the evacuated and degassed formed material is reformed by HIP (hot isostatic press) (step S204). The forming condition of HIP is temperature of 400° C. to 450° C., duration of 30 sec, and pressure of 6000 tons, and the formed material is defined to be 400 mm in diameter.

To remove the can, the outside and end face are ground by machining (step S205), and the hot billet is hot extruded by using a port hole extruder (step S206). In this case, the extrusion condition is heating temperature of 500° C. to 520° C. and extrusion speed of 5 m/min. The condition may be properly changed depending on the content of B.

After extrusion forming, and straightening by tension (step S207), non-stationary portion and evaluation portion are cut off, and a product is obtained (step S208). A completed square pipe 1 has a square shape as shown in FIG. 1, with one side of section being 162 mm and inside being 151 mm.

In this example, the extruder of port hole type of high rate of compression and suited to extrusion of complicated shape of aluminum or other soft material is used, but the extruder is not limited to this type. For example, a fixed or moving mandrel type may be employed. Aside from direct extrusion, hydrostatic extrusion may be applied, and it can be selected properly within a possible range for the user. By the HIP, a near-net shape forming is possible, but considering a subsequent extrusion step, it may be replaced by pseudo-HIP, and a sufficient precision may be assured. Specifically, a ceramic granular material is charged as pressure transfer medium in the die for comprising in uniaxial direction, and sintered. By this method, too, a favorable square pipe 1 can be manufactured.

Or, instead of the HIP, a hot press may be used. The hot pressure is a method of sintering by uniaxial pressure by heating a heat-resistant die. In this case, in this hot press process, the preformed material is sealed in a can, and evacuated and degassed, and is heated at 400° C. to 450° C., duration from 10 sec to 30 sec, and pressurized at 6000 tons. By the subsequent extrusion process, a billet of a sufficient quality can be manufactured by the hot press, but if the sintering state is not satisfactory depending on billet size or other condition, HIP may be applied. The advantages of hot press are high productivity and low cost. Aside from hot pressure, the atmospheric sintering method may be also possible. Further, the CIP step may be omitted. In this case, it safes the labor of putting into rubber case, and the manufacture of square pipe is facilitated.

Figure 3:
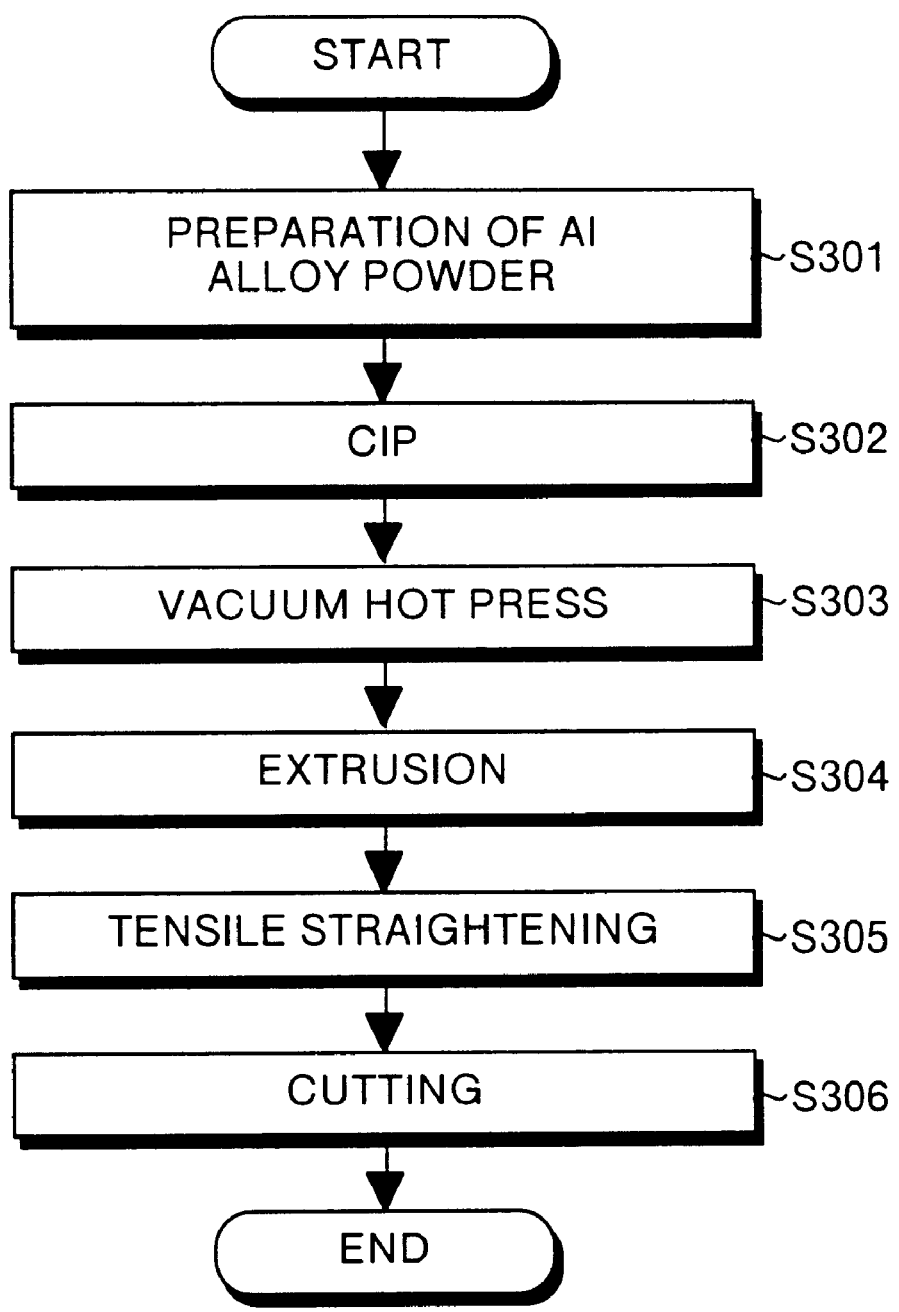
FIG. 3 is a flowchart showing a manufacturing method of square pipe according to a second embodiment of the invention.

FIG. 3 is a flowchart showing a manufacturing method of square pipe 1 according to a third embodiment of the invention. As shown in the chart, the feature of this manufacturing method of square pipe 1 lies in the use of vacuum hot press (vacuum hot press process: S303) instead of the can sealing and evacuating, heating and degassing step (S203), HIP step (S204) and outside and end face grinding step (S205). The other steps are same as in a second embodiment, and the explanation is omitted (steps S301, S302, S304 to S306).

Figure 4:
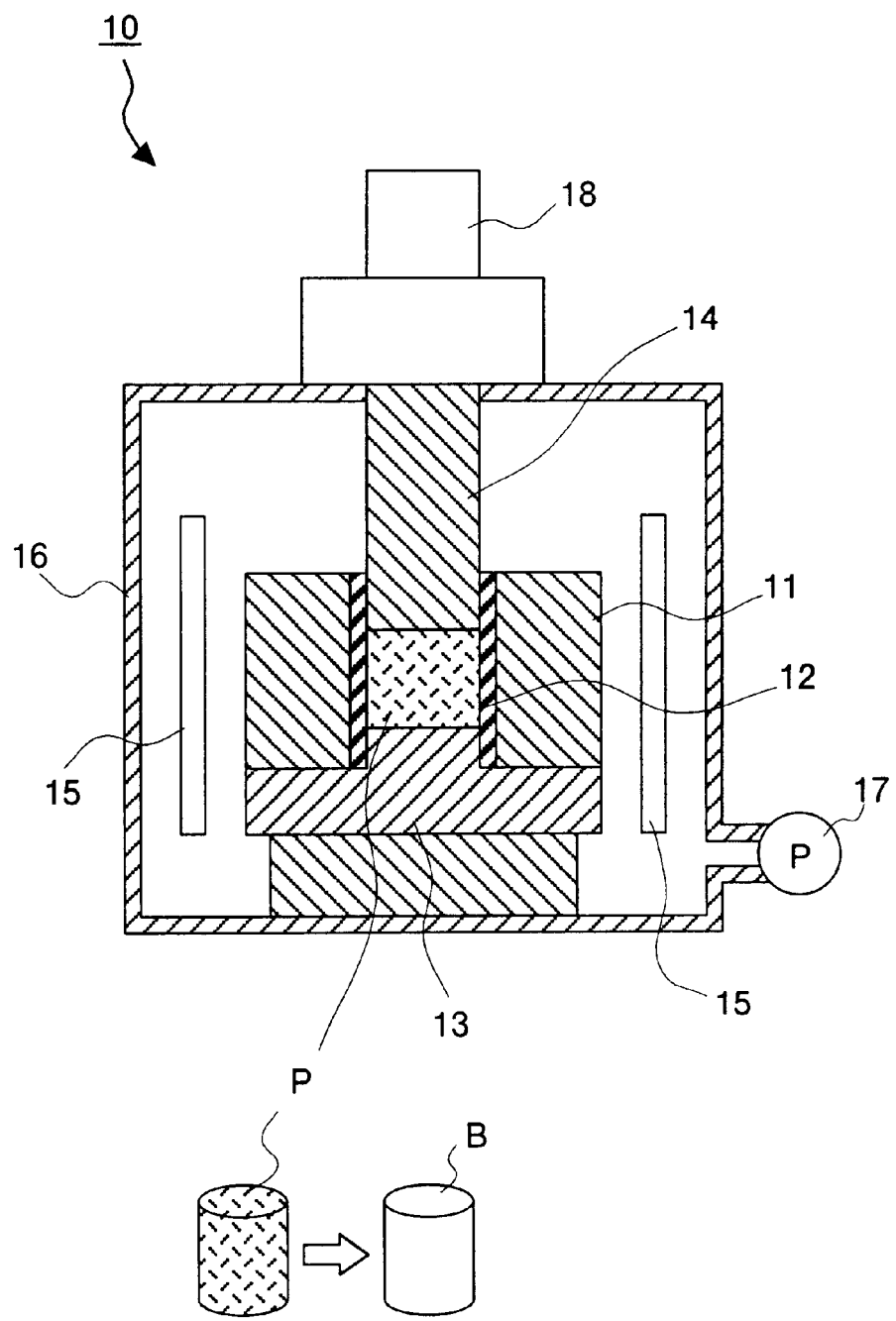
FIG. 4 is a diagram showing a structure of vacuum hot press machine used in this manufacturing method of square pipe.

FIG. 4 is a diagram showing a structure of vacuum hot press machine used in this manufacturing method of square pipe. This vacuum hot press machine 10 is composed of a die 11, and a die ring 12, a base 13 and a punch 14 disposed inside of the die 11. All these components are made of graphite. In the forming chamber composed of die ring 12, base 13 and punch 14, the preformed material P manufactured in the CIP process is inserted. The die 11 is surrounded by a graphite heater 15.

The die ring 12, base 13 and punch 14 are accommodated in a vacuum vessel 16. The vacuum vessel 16 is provided with a pump 17 for evacuating. The punch 14 is driven by a hydraulic cylinder 18 provided on the top of the vacuum vessel 16. The die ring 12 is disposed at the inside of the die 11 because it is easier to draw out the billet after pressurizing. The inside diameter of the die 11 is about 350 mm. In actual hot press operation, a lubricant is applied or sprayed to sliding parts. As the lubricant, BN (boron nitride) having an extremely excellent lubricating performance may be used. In this example, one-side extrusion is shown, but both-side extrusion or floating method may be also employed.

For vacuum hot pressing, after applying the lubricant in the die 11, the preformed material P is inserted, and the punch 14 is set thereon. The vacuum vessel 16 is evacuated to a specified pressure, and the chamber is heated to 400° C. to 500° C. by the graphite heater 15. The specified temperature range is maintained for 30 to 60 minutes, and pressurization is started at around 200° C. After pressurizing and sintering the preformed material P, it is taken out together with the die 11 from the vacuum vessel 16, and the billet B is separated from the die 11. At this time, the billet B is extruded from outside, and the die ring 12 is also slightly pushed out together with the billet B, so that the billet B may be taken out easily. The removed billet B is extruded in the next extrusion step (S304), and straightened by tension (step S305), and cut off (step S306) and a square pipe 1 is obtained as a final product.

According to this manufacturing method of square pipe 1, canning is omitted, and the billet B is formed by using vacuum hot press, and therefore (1) the cost of the can is saved, (2) the cutting step for removing the can (step S205) is omitted, and (3) the related manufacturing process (step S2207) can be omitted. Hence, the square pipe 1 can be manufactured efficiently and at low cost.

Figure 5:
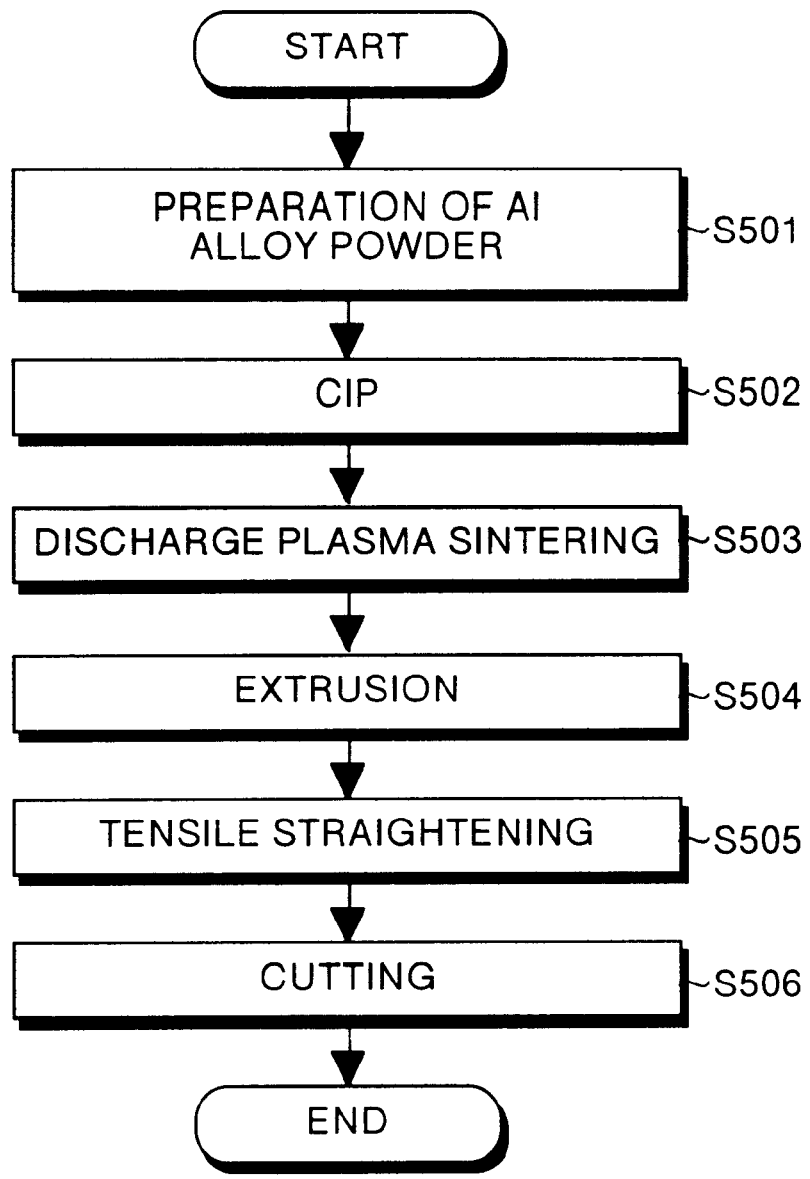
FIG. 5 is a flowchart showing a manufacturing method of square pipe according to a third embodiment of the invention.

FIG. 5 is a flowchart showing a manufacturing method of square pipe according to a fourth embodiment of the invention. As shown in the chart, the feature of this manufacturing method of square pipe 1 lies in the use of discharge plasma sintering (discharge plasma sintering process: step S503) instead of the can sealing and evacuating, heating and degassing step (S203), HIP step (S204) and outside and end face grinding step (S205). The discharge plasma sintering is to sinter under pressure by making use of spark discharge energy of transient arc discharge phenomenon. The other steps are same as in the first embodiment, and the explanation is omitted (steps 501, S502, S504 to S506).

Figure 6:
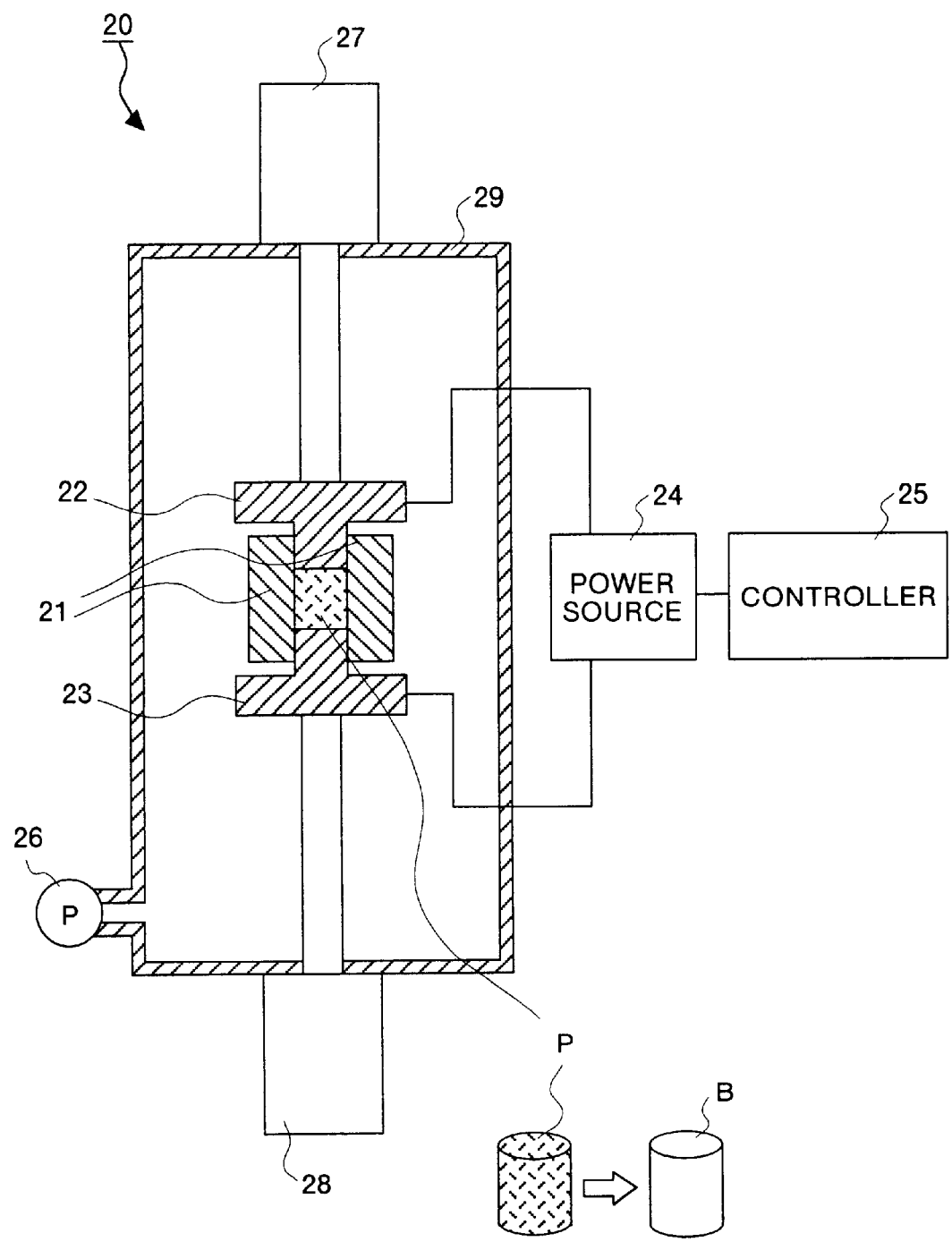
FIG. 6 is a diagram showing a structure of discharge plasma sintering machine used in this manufacturing method of square pipe.

FIG. 6 is a diagram showing a structure of discharge plasma sintering machine used in this manufacturing method of square pipe. The discharge plasma sintering machine 20 comprises a graphite die 21, upper and lower punches 22, 23 serving also as upper electrode and lower electrode, a power source 24 for supplying a pulse current to the upper and lower punches 22, 23, a controller 25 for controlling the power source 24, a vacuum vessel 29 for accommodating the die 21 and punches 22, 23, a pump 26 for evacuating the vacuum vessel 29, and hydraulic cylinders 27, 28 for driving the punches 22, 23. The preformed material P by CIP is inserted into a forming chamber composed of the die 21 and punches 22, 23.

Discharge plasma sintering is easy to control the sintering energy and easy to handle, among other merits, but high speed sintering is very important for this manufacturing method. In the hot press, for example, the sintering time is about 5 hours, and it is only about 1 hour in this discharge plasma sintering. Because of high speed sintering, the manufacturing time can be shortened.

In the condition of discharge plasma sintering, the degree of vacuum in the vacuum vessel 29 is $10^{-2}$ Torr, and the temperature is raised to 500° C. in about 10 minutes. This temperature range is maintained for 10 to 30 minutes, and a pressure of 5 to 10 tons is applied. When a pulse current is applied between the punches 22 and 23, the discharge point in the preformed material P is moved and dispersed in the entire surface. In the spark discharge portion, the temperature is high locally (1000° C. to 10000° C.), and the intergranular contact point is grown to a surface, thereby forming a neck to be in fused state. As a result, even in the case of an aluminum material forming a hard oxide film, by the sputtering action of discharge plasma, the oxide film of the aluminum surface is destroyed, so that the billet can be easily sintered.

According to this manufacturing method of square pipe 1, the sintering time can be shortened as compared with the case of using the hot press. Besides, since the passive film of aluminum is destroyed by the discharge action, sintering is easy. The benefits of omitting the canning process are same as in the second embodiment. Aside from discharge plasma sintering, hot plasma sintering method may be also employed. The hot plasma sintering method is pressure-free sintering by using plasma heat of ultrahigh temperature. It is also possible to manufacture by ordinary discharge sintering.

Figure 7:
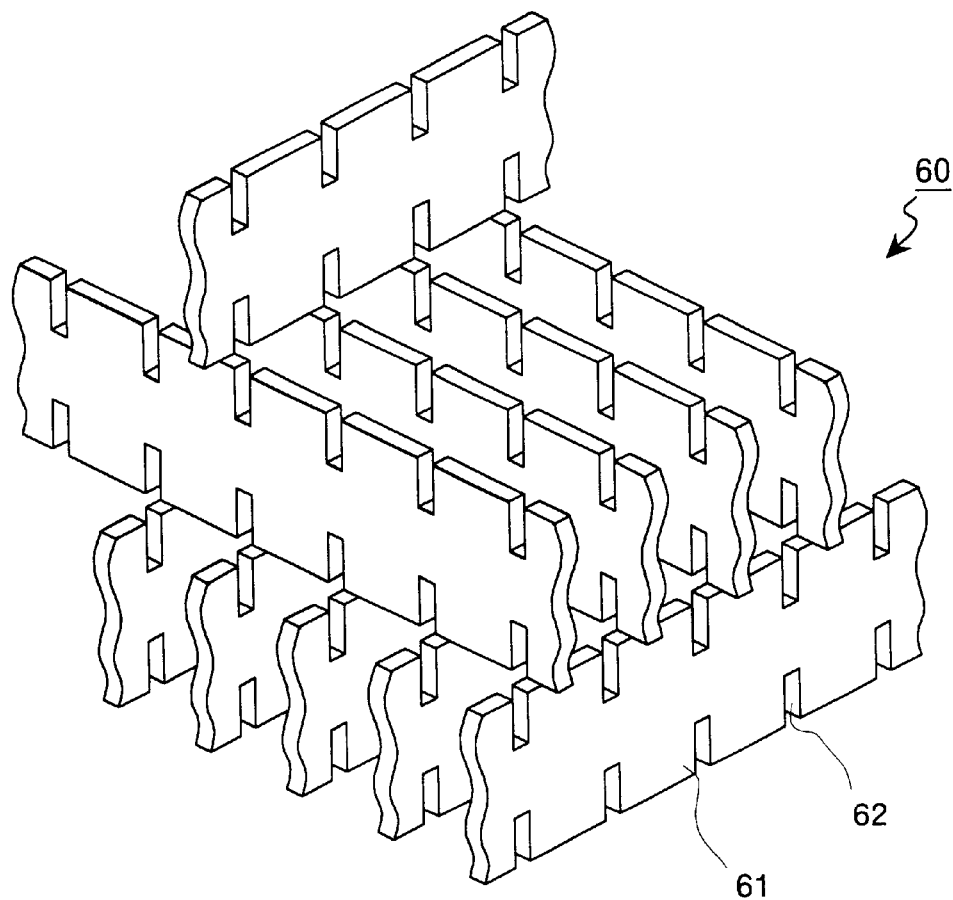
FIG. 7 is a diagram showing a structure of attriter mill used in a manufacturing method of square pipe according to a fourth embodiment of the invention.

The rack for accommodating spent fuel assemblies may be also formed by flat plates, instead of the square pipes. FIG. 7 is a perspective view showing a rack of flat plates. In this flat plate type rack 60, first by extruding a billet manufactured by the manufacturing methods of the second to fourth embodiments, plate members 61 of about 300 mm to 350 mm in width are formed. In succession, plural slits 62 are formed consecutively in each plate member 61. The plate members 61 are engaged with each other vertically and laterally at the slits 62, and a lattice section is formed. In the case of flat plate type rack 60, meanwhile, since the plate thickness is smaller than in the square pipe type, the amount of B to be dispersed in Al is somewhat larger. This flat plate type rack is used as the cask or the rack of spent fuel pool.

Figure 8:
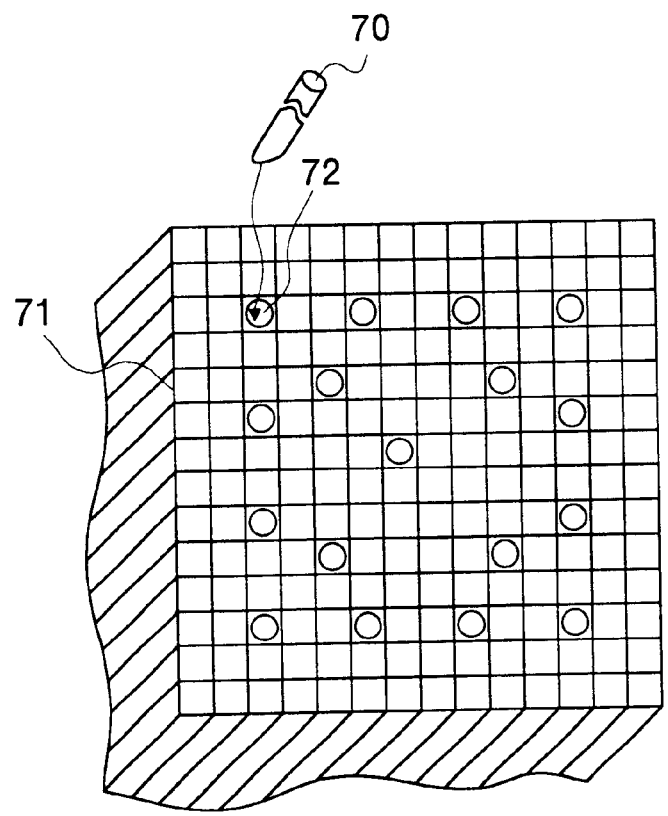
FIG. 8 is a magnified view showing high energy powder manufactured by mechanical alloying.

In the second to fourth embodiments, the neutron absorbing capability is given by dispersing boron in the square pipe 1 to prevent the spent fuel assemblies from reaching the critical point. In a sixth embodiment, without depending on the square pipe 1, a round bar for absorbing neutrons from the spent fuel assemblies is formed. A round bar 70 is inserted into a control rod cluster guide pipe 72 (or measuring pipe) of a spent fuel assembly 71 shown in FIG. 8. By inserting the round bar 70, a specified neutron absorbing capability is assured, and it is hence not necessary to disperse much boron in the square pipe 1. The manufacturing method of the round bar 70 differs only in the shape of the die in the final extrusion process, and hence the same manufacturing method as in the second to fourth embodiments may be employed.

Figure 9:
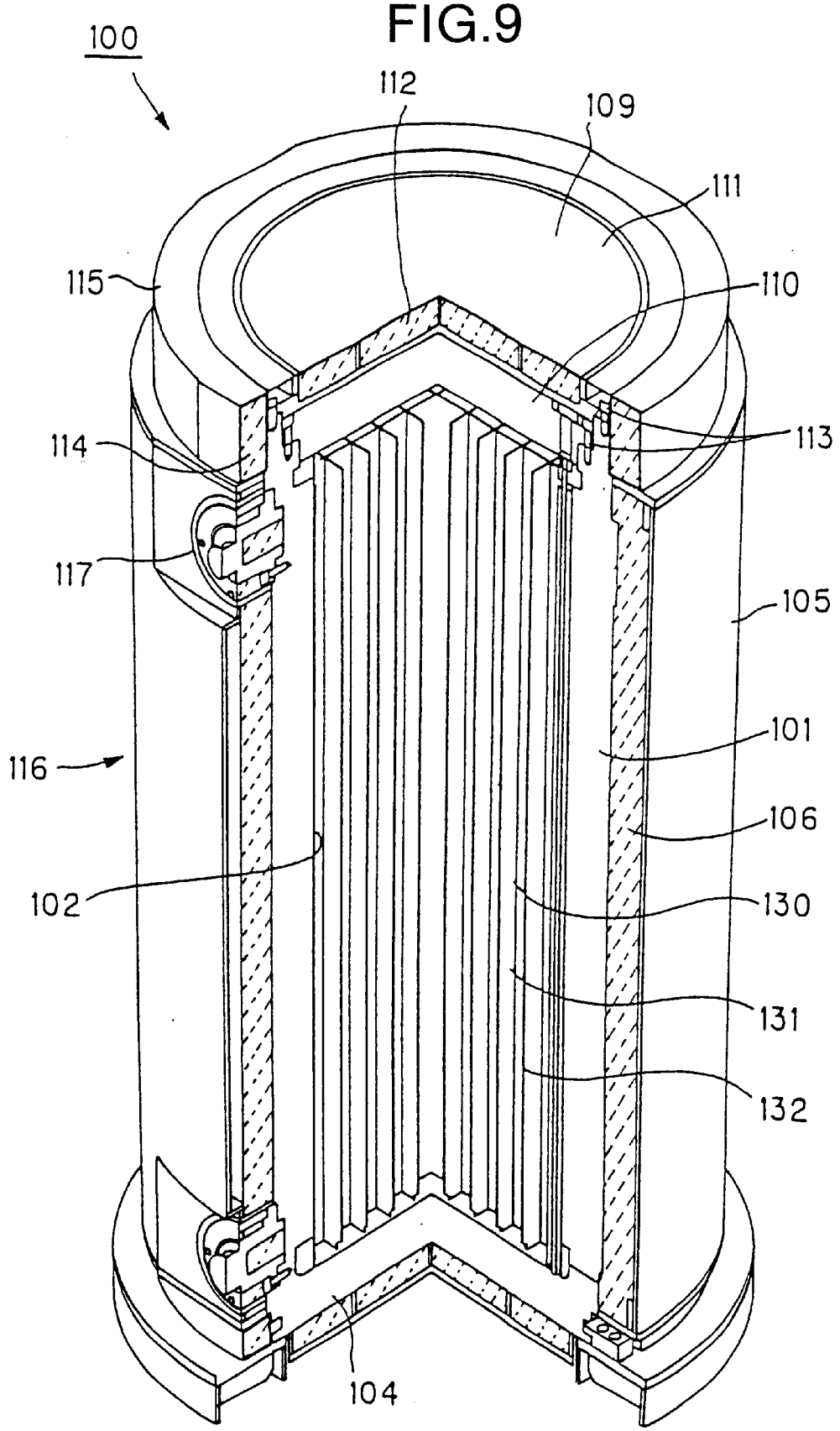
FIG. 9 is a schematic structural diagram of a powder manufacturing machine for executing a manufacturing method according to a fifth embodiment of the invention.
Figure 10:
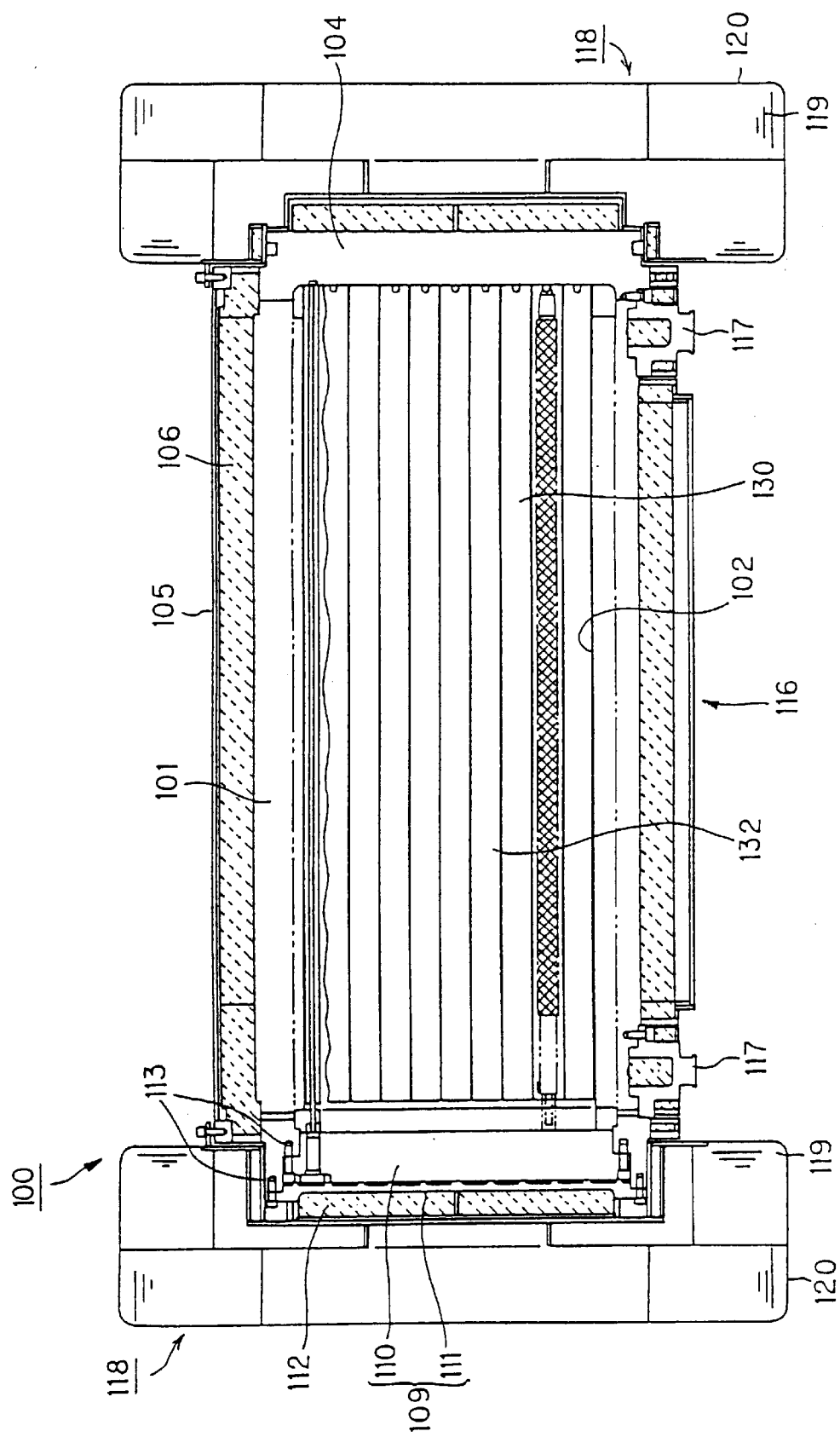
FIG. 10 is an explanatory diagram showing powder manufactured by the powder manufacturing machine shown in FIG. 9.
Figure 11:
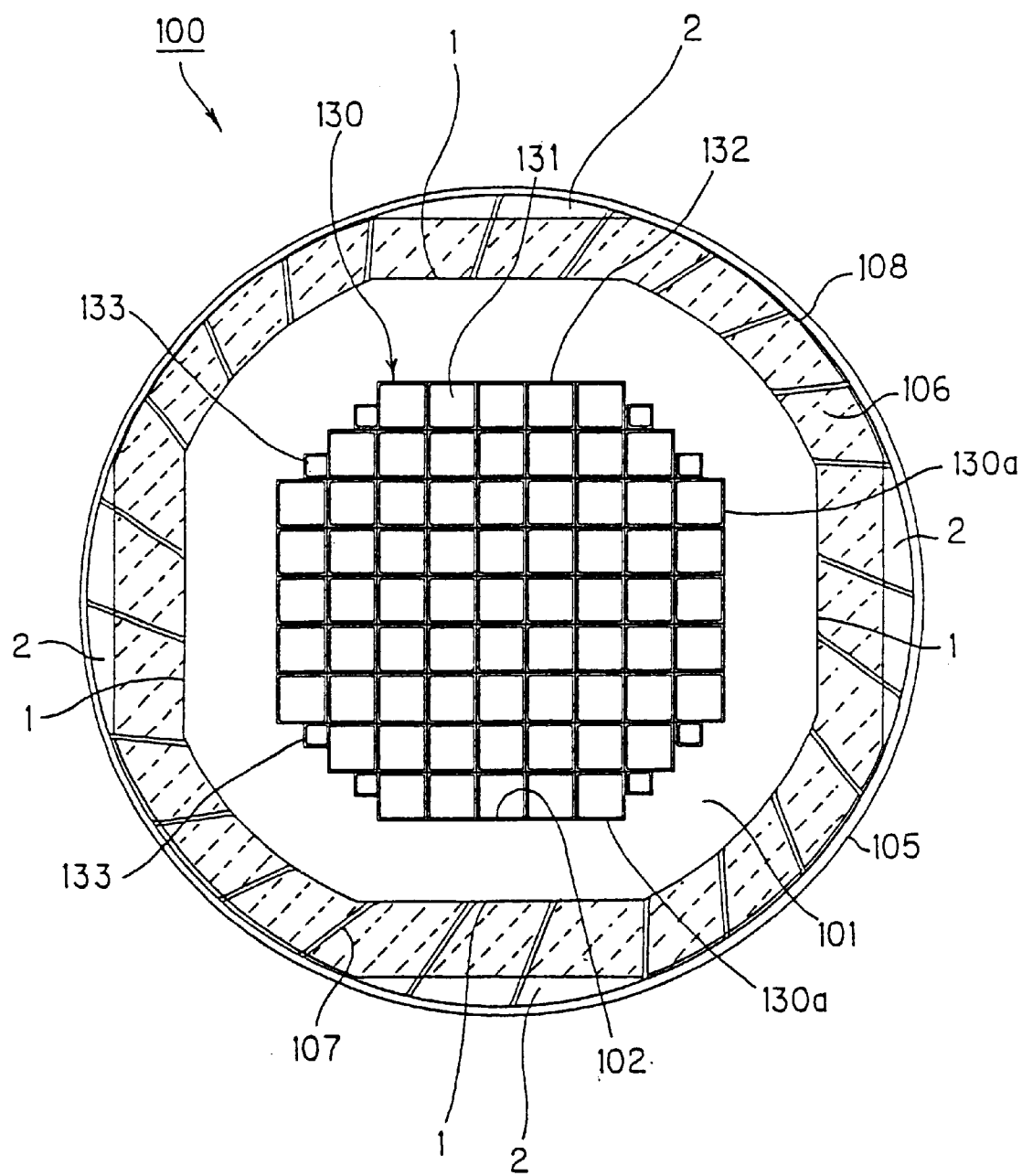
FIG. 11 is a perspective view showing a structure of a rack of flat plate type.

A specific example of use of the square pipe 1 is explained. FIG. 9 is a perspective showing a cask. FIG. 10 is an axial direction sectional view of the cask shown in FIG. 9. FIG. 11 is a radial direction sectional view of the cask shown in FIG. 9. This cask 100 is manufactured by machining the inside of a cavity 102 of a shell 101 in conformity with the outer shape of a basket 130.

The shell 101 and bottom plate 104 are carbon steel forged pieces having gamma-ray shielding function. Instead of the carbon steel, stainless steel may be also used. The shell 101 and bottom plate 104 are bonded by welding. To assure the enclosing performance as pressure-proof vessel, a metal gasket is provided between a primary lid 110 and the shell 101.

The gap between the shell 101 and outer tube 105 is filled up with a resin 106 which is a high polymer material containing much hydrogen, having neutron shielding function. Also between the shell 101 and outer tube 105, plural copper inner fins 107 for heat conduction are welded, and the resin 106 is poured into the space formed by the inner fins 107 in fluid state, and is cooled and solidified. The inner fins 107 are preferred to be provided at high density in the portion of a large heat capacity in order to cool uniformly. A thermal expansion allowance 108 of several millimeters is provided between the resin 106 and outer tube 105.

The lid 109 is composed of a primary lid 110 and a secondary lid 111. The primary lid 110 is a disk made of stainless steel or carbon steel for shielding gamma-rays. The secondary lid 111 is also a disk of stainless steel or carbon steel, and its upper surface is sealed with resin 112 as neutron shielding element. The primary lid 110 and secondary lid 111 are attached to the shell 101 by means of stainless steel or carbon steel bolts 113. Metal gaskets are place between the primary lid 110, secondary lid 111 and the shell 101, and the inside is sealed tightly. The lid 109 is surrounded by an auxiliary shielding element 115 sealed with resin 114.

At both sides of the cask main body main body 116, there is a trunnion 117 for suspending the cask 100. In FIG. 9, the auxiliary shielding element 115 is provided, but when conveying the cask 100, the auxiliary shielding element 115 is removed, and a shock absorber 118 is provided (see FIG. 10). The shock absorber 118 is composed by assembling a buffering member 119 such as redwood into an outer tube 120 made of stainless steel material.

Figure 12:
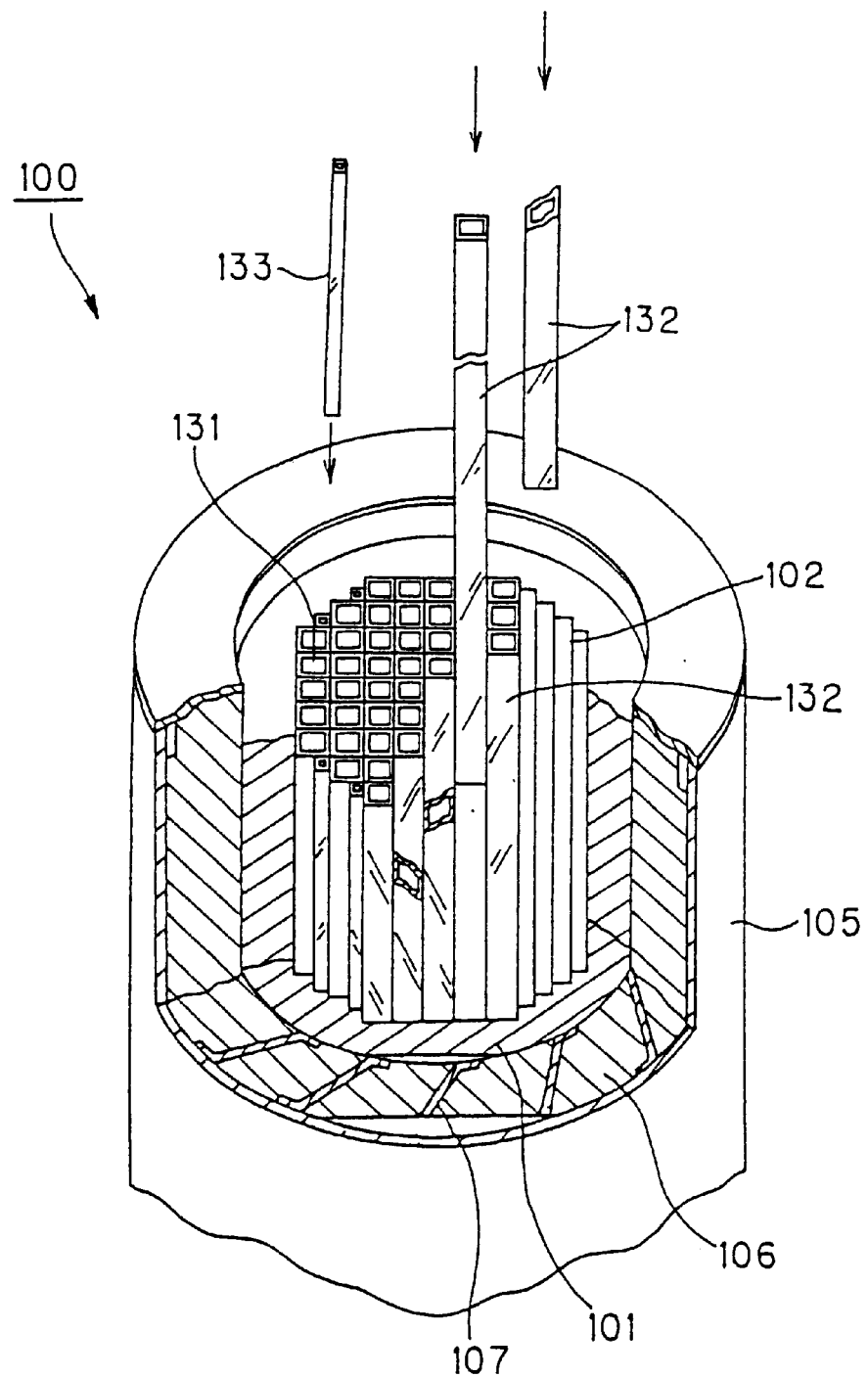
FIG. 12 is an explanatory diagram showing a structure of a spent fuel assembly.

The basket 130 is composed of 69 square pipes 1 for composing a cell 131 for accommodating spent fuel assemblies. The square pipes 1 are manufactured by the manufacturing method of the first to fifth embodiments. FIG. 12 is a perspective view showing an inserting method of square pipes. The square pipes 1 manufactured in the above process are sequentially inserted long the inner processing shape of the cavity 102.

As shown in FIG. 12 and FIG. 10, dummy pipes 133 are inserted at both sides of square pipe row of 5 or 7 cells in the cavity 102. The dummy pipes 133 are used for reducing the weight of the shell 101, making uniform the thickness of the shell 101, and fixing the square pipes 1 securely. The dummy pipes 133 are also made of aluminum alloy containing boron, and are manufactured in the same process. Meanwhile, the dummy pipes 133 may be omitted.

The spent fuel assemblies to be accommodated in the cask 100 contain fissile materials and fission products, generate radiation, and are accompanied by decay heat, and hence it is necessary to maintain the cooling function, shielding function, and criticality preventive function of the cask 100 securely during storage period (about 60 years). In the cask 100 of the first embodiment, by machining the inside of the cavity 102 of the shell 101, the outside of the basket 130 composed of square pipes 1 is inserted in nearly tight contact state (without large gap), and an inner fin 107 is provided between the shell 101 and outer tube 105. Accordingly, the heat from the fuel rod conducts to the shell 101 through the square pipe 1 or filing helium gas, and is released mainly from the outer tube 105 through the inner fin 107.

The gamma-rays generated from the spent nuclear fuel assemblies is shielded by the shell 101, outer tube 105 or lid 109 made of carbon steel or stainless steel. Besides, neutrons are shielded by the resin 106 so as to reduce exposure effects to the radiation operation workers. Specifically, it is designed to obtain a shielding function so that the surface dose equivalent rate of 2 mSv/h or less and dose equivalent rate of 100 μSv/h or less at 1 m from the surface may be guaranteed. Since aluminum alloy with boron is used in the square pipe 1 for composing the cell 131, it is effective to prevent from reaching the criticality by absorbing neutrons.

Further, according to this cask 100, by machining the inside of the cavity 102 of the shell 101, the square pipes 1 for composing the outside of the basket 130 may be inserted in nearly tight contact state, and the fronting surface area of the square pipes and cavity is wide, and the heat conduction from the square pipes 1 is smooth. Also by eliminating the space region in the cavity 102, if the number of constituent square pipes 1 is the same, the shell 101 is compact and lightweight. To the contrary, when the outside diameter of the shell 101 is not changed, the number of cells may be maintained, so that the accommodation capacity of spent nuclear fuel assemblies may be increased. Specifically, in this cask 100, 69 spent nuclear fuel assemblies can be accommodated, and the outside diameter of the cask main body 116 may be suppressed to 2560 mm, and the weight to 120 tons.

Figure 13:
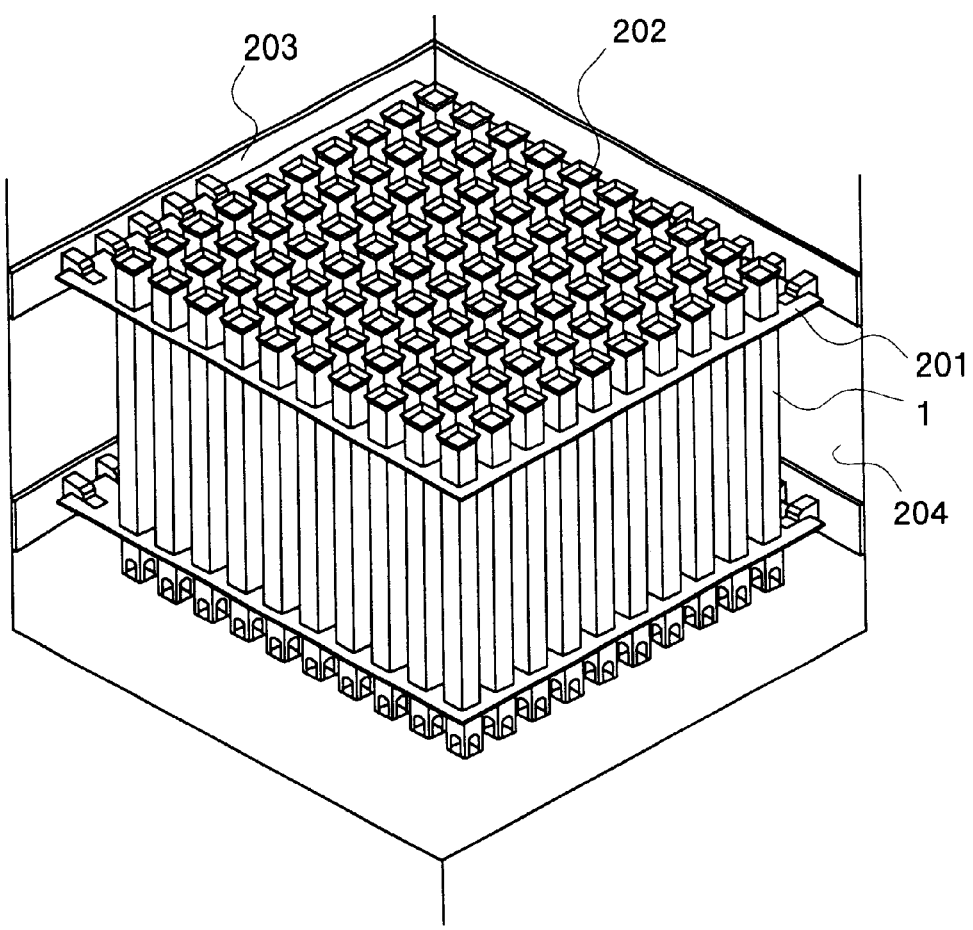
FIG. 13 is a perspective view showing a structure of a cask.

Other example of use of square pipes is explained. FIG. 13 is a perspective view showing a spent fuel pool for PWR. This spent fuel pool 200 sets up a plurality of square pipes 1 manufactured in the second to fourth embodiments, and has a rack 202 supported by support plates 201 at its upper and lower parts. The rack 202 is installed in a steel reinforced concrete pit 203, and the inside of the pit 203 is lined with stainless steel plate 204 for prevention of leak of pit water. The inside of the pit 203 is always filled with boric acid water. Since the spent fuel pool 200 is composed of the square pipes 1, the neutron absorption capability is high and the structural soundness is assured. Hence, the spent nuclear fuel assemblies are effectively prevented from reaching criticality.

EXAMPLE

In manufacture of aluminum composite material in the first embodiment, JISA6N01 was used as Al powder, and its mean particle size was 70 μm. As the B compound, B$_4$C powder with mean particle size of 9 μm was used. The content of the B$_4$C powder was 5% by weight. The B$_4$C particles are finely dispersed in the Al alloy, and hence prevent slipping of dislocation and improve the strength. As the material powder of third particle, Al$_2$O$_3$, BN, SiC and ZrB$_2$ were used, the mean particle size and content were set as specified below.

TABLE 1

| Material | Mean particle size (μm) | Content (mass %) |
|---|---|---|
| Al2O3 | 0.5 | 5 |
| Al2O3 | 5 | 5 |
| Al2O3 | 20 | 5 |
| Al2O3 | 0.5 | 0.05 |
| Al2O3 | 0.5 | 1 |
| Al2O3 | 0.5 | 35 |

TABLE 1-continued

| Material | Mean particle size (μm) | Content (mass %) |
|---|---|---|
| SiC | 3 | 5 |
| BN | 3 | 5 |
| ZrB$_2$ | 3 | 5 |

Figure 14:
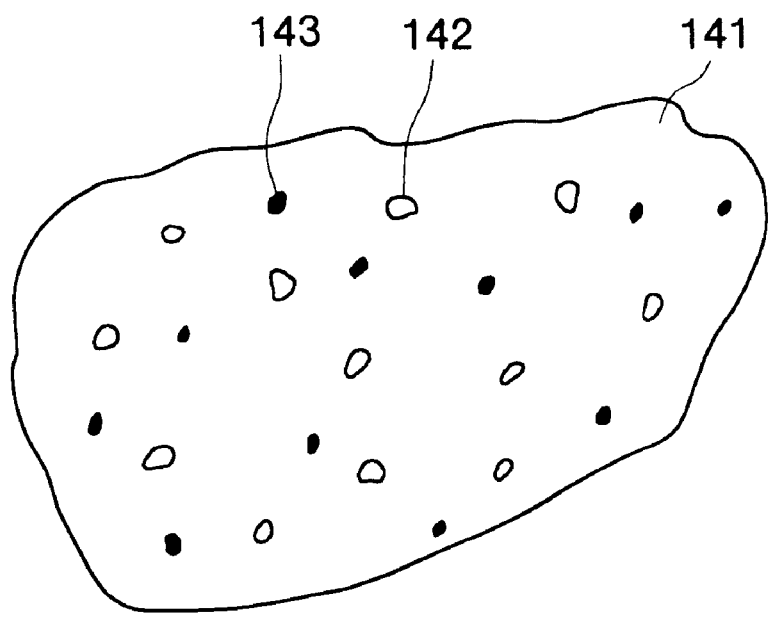
FIG. 14 is a schematic diagram showing Al alloy when mechanically alloyed in a specific condition.

The MA process was conducted in the following conditions. FIG. 14 is a schematic diagram showing Al alloy when the MA is processed in the following conditions. In the diagram, reference numeral 141 shows Al, 142 are B$_4$C particle, and 143 are third particle.

TABLE 2

| Speed | Ball | Atmosphere |
|---|---|---|
| 300 RPM | SUJ-2 ⅜ inch (17.5 kgf) | Ar (0.5 l/min) |

| Powder amount | Mill additive | MA duration |
|---|---|---|
| 600 g/batch | Ethanol: 18 cc (30 cc/powder kg) | 0.5 Hr 1.0 Hr 10.0 Hr |

Thus prepared Al alloy powder was dissolved in 10% hydrochloric acid, and undissolved B$_4$C particle and third particle were filtered and dried, and observed by electron microscope, and the mean particle size was determined. Results are shown below.

TABLE 3

| Material | Mean particle size (μm) | Content (mass %) | Mean particle size after MA (μm) |
|---|---|---|---|
| Al2O3 | 0.5 | 5 | 0.3 |
| Al2O3 | 5 | 5 | 1 |
| Al2O3 | 20 | 5 | 13 |
| Al2O3 | 0.5 | 0.05 | 0.4 |
| Al2O3 | 0.5 | 1 | 0.3 |
| Al2O3 | 0.5 | 35 | 0.3 |
| SiC | 3 | 5 | 1 |
| BN | 3 | 5 | 0.8 |
| ZrB$_2$ | 3 | 5 | 0.9 |

Using the Al alloy powder manufactured by the MA process, the tensile strength and breaking elongation were measured. First, the MA powder was put into a graphite die, and in evacuated state, it was pressurized and sintered at temperature of 500° C., and a molded material of 40 mm in diameter and 40 mm in height was fabricated. In succession, at an extrusion ratio of 25, the diameter of 40 mm was reduced to 8 mm. As a result, a bar test piece was obtained. The test piece was held at 200° C. for 100 hours, and cooled, and the test piece was processed into a shape suited to testing. The tensile test was conducted in the temperature condition of 200° C. The test results are shown below. Test pieces 3, 4, 6, 10 were fabricated as comparative examples.

TABLE 4

| No. | Material | Mean particle size (μm) | Content (mass %) | Mean particle size after MA (μm) | Tensile strength (MPa) | Rupture elongation (%) |
|---|---|---|---|---|---|---|
| 1 | Al2O3 | 0.5 | 5 | 0.3 | 350 | 5 |
| 2 | Al2O3 | 5 | 5 | 1 | 330 | 4 |
| 3 | Al2O3 | 20 | 5 | 13 | 260 | 2 |
| 4 | Al2O3 | 0.5 | 0.05 | 0.4 | 282 | 6 |
| 5 | Al2O3 | 0.5 | 1 | 0.3 | 300 | 5.5 |
| 6 | Al2O3 | 0.5 | 35 | 0.3 | 380 | 1 |
| 7 | SiC | 3 | 5 | 1 | 340 | 4 |
| 8 | BN | 3 | 5 | 0.8 | 320 | 5 |
| 9 | ZrB$_2$ | 3 | 5 | 0.9 | 335 | 4.5 |
| 10 | No additive | — | — | — | 280 | 6 |

No. 3, 4, 6, 10: Comparative examples

As a result of experiment, all test pieces 1, 2, 5, 7, 8, 9 adding the third particle presented a high tensile strength of over 300 MPa. The breaking elongation was also favorable, being 4% or more. By contrast, in comparative test piece 3, the mean particle size of third particle after MA was 13 μm, and in this case, not only the sufficient tensile strength was not obtained, but also the value was lower than that of test piece 10 not adding the third particle. The breaking elongation of test piece 3 was about 2%, and sufficient value was not obtained. In test piece 4, the content of the third particle was 0.05% by weight, but as compared with test piece 10 not adding the third particle, neither the tensile strength nor the breaking elongation was not changed notably. In test piece 6, since the content of the third particle was 35% by weight, a sufficient tensile strength was obtained, but the breaking elongation was a low 1%.

Hence, as for the third particle, the B$_4$C particle seems to have an effect of promoting the slip suppressing performance, and by defining the content in a range of 0.1% by weight to 30% by weight or less, the mean particle size of the third particle in the Al matrix in a range of 0.01 μm more to 10 μm or less, it has been known that the strength and breaking elongation can be enhanced. Besides, instead of the oxide (test pieces 1, 2, 5), by using carbide (test piece 7), nitride (test piece 8) or boride (test piece 9) as the third particle, it is also known that the strength and breaking elongation can be enhanced.

As explained herein, in the aluminum composite power of the invention as the first aspect, by employing mechanical alloying, since neutron absorber and third particle are dispersed in the aluminum matrix, the material strength can be increased. In particular, favorable effects are obtained when the content of the dispersed third particle is 0.1% by weight or more to 30% by weight or less as the second aspect. Moreover, when the third particle is added so that the mean particle size of the third particle in the aluminum matrix may be 0.01 μm or more to 10 μm or less, further preferable effects are obtained as the third aspect.

In succession, in the aluminum composite powder, the content of the neutron absorber is preferred to be 1% by weight or more to 20% by weight or less as the fourth aspect, and also the mean particle size of the neutron absorber powder to be added is preferred to be 0.01 μm or more to 100 μm or less as the fifth aspect. As a result, the required toughness is obtained, and lowering of strength can be prevented.

In the manufacturing method of aluminum composite powder of the invention as the sixth aspect, by adding a neutron absorber to aluminum powder, and also adding a third particle such as oxide, since the neutron absorber and third particle are uniformly dispersed in the Al matrix by mechanical alloying of these powder materials, a very large strength is obtained.

Also in the manufacturing method of aluminum composite powder of the invention as the seventh aspect, by forming an oxide film on the surface of the aluminum powder, and mechanical alloying, the oxide film is separated and ground, and dispersed in the aluminum matrix. Thus, it saves the labor of manufacturing the third particle or the step of adding the third particle, so that the aluminum composite powder can be manufactured easily.

In the aluminum composite material of the invention as the eighth aspect, since the neutron absorber and third element composed of oxide, nitride, carbide or boride are contained in the in aluminum matrix of sinter, a composite material of high strength is obtained. In particular, the content of the third particle is 0.1% by weight or more to 30% by weight or less, so that a favorable result is obtained as the ninth aspect, and when its mean particle size is 0.01 μm or more to 10 μm or less, a further favorable result will be obtained as the tenth aspect.

Moreover, in the aluminum composite material, when the content of the neutron absorber is 1% by weight or more to 20% by weight or less as the eleventh aspect, and the mean particle size of the neutron absorber powder to be added is 0.01 μm or more to 100 μm or less as the twelfth aspect, a required toughness is obtained, and lowering of strength can be prevented.

In the manufacturing method of spent fuel storage member of the invention as the thirteenth aspect, by mixing aluminum powder, neutron absorber powder, and third particle, and preforming the mixed powder, this preformed material is sintered after canning. As a result, the spent fuel storage member of high quality and high strength is manufactured. Further, when the sintering process is done by hot pressing or HIP, the spent fuel storage member of higher quality and higher strength is manufactured as the fourteenth aspect.

In the manufacturing method of spent fuel storage member of the invention as the fifteenth aspect, since atmospheric sintering or vacuum sintering is done by omitting canning, machining such as grinding of outside is not required, and the manufacturing process is simplified. As a result, the spent fuel storage member can be manufactured at a very low cost. Also, by conducting the sintering process by vacuum hot pressing, the inexpensive and high quality spent fuel storage member can be manufactured as the sixteenth aspect.

In the manufacturing method of spent fuel storage member of the invention as the seventeenth aspect, since the preformed material is sintered by discharge, the sintering process is finished in a short time. Accordingly, the manufacturing efficiency can be enhanced. Besides, when the discharge sintering process is done by discharge plasma sintering, the sintering process is improved, and billets of high quality are obtained at lower cost as the eighteenth aspect.

Also in the manufacturing method of spent fuel storage member of the invention as the nineteenth and twentieth aspects, by extruding the billets manufactured in the above process, square pipes or bars may be easily manufactured as the spent fuel storage members.

In the manufacturing method of spent fuel storage member of the invention as the twenty-first aspect, by mechanical alloying, the ground neuron absorber and third particle are kneaded and dispersed in the aluminum powder. It hence prevents aggregation in sintering, and the composition of the spent fuel storage member manufactured by this method is homogeneous, and the mechanical strength is enhanced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An aluminum composite powder obtained by a process comprising:

mixing an aluminum powder or an aluminum alloy powder as an aluminum matrix material with a neutron absorber and a third particle comprising a member selected from the group consisting of an oxide, a nitride, a carbide and a boride, to obtain a mixed powder; and mechanically alloying said mixed powder, thereby grinding said neutron absorber, said third particle and said aluminum matrix material and dispersing said neutron absorber and said third particle in said aluminum matrix material, wherein a content of said third particle is 0.1% by weight or more to 30% by weight or less.

2. The aluminum composite powder according to claim 1, wherein a mean particle size of said third particle in said aluminum matrix material 0.01 $\mu$m or more to 10 $\mu$m or less.

3. The aluminum composite powder according to claim 1, wherein a content of said neutron absorber is 1% by weight or more to 20% by weight or less.

4. The aluminum composite powder according to claim 1, wherein a mean particle size of said neutron absorber powder to be added is 0.01 $\mu$m or more to 100 $\mu$m or less.

5. A method for manufacturing an aluminum composite powder, comprising:

preliminary forming an oxide film on a surface of an aluminum powder or an aluminum alloy powder, to obtain an aluminum powder having said oxide film on its surface or an aluminum alloy powder having said oxide film on its surface;

mixing said aluminum powder having said oxide film on its surface or said aluminum alloy powder having said oxide film on its surface as an aluminum matrix material with a neutron absorber to obtain a mixed powder; and mechanically alloying said mixed powder, thereby
   a) separating said oxide film from said aluminum powder having said oxide film on its surface or said aluminum alloy powder having said oxide film on its surface, to obtain a separated oxide film and separated aluminum powder or a separated aluminum alloy powder, and b) grinding said neutron absorber, said separated oxide film and said separated aluminum powder or said separated aluminum alloy powder, and c) dispersing said neutron absorber and said separated oxide film in said separated aluminum powder or said separated aluminum alloy powder.

6. An aluminum composite material, comprising:

an aluminum matrix comprising a neutron absorber and a third particle comprising a member selected from the group consisting of an oxide, a nitride, a carbide and a boride;

wherein said oxide is selected from the group consisting of $Al_2O_3$, $ZrO_2$, $SiO_2$, MgO and $Cr_2O_3$;

wherein said nitride is selected from the group consisting of $Si_3N_4$ and BN;

wherein said neutron absorber is selected from the group consisting of $B_4C$ and $B_2O_3$;

wherein a content of said neutron absorber is 1% by weight or more to 20% by weight or less, and wherein a content of said third particle is 0.1% by weight or more to 30% by weight or less.

7. The aluminum composite material according to claim 6, wherein a mean particle size of said neutron absorber powder to be added is 0.01 $\mu$m or more to 100 $\mu$m or less.

8. An aluminum composite material, comprising:

an aluminum matrix comprising a neutron absorber sad a third particle comprising a member selected from the group consisting of an oxide, a nitride, a carbide and a boride;

wherein said oxide is selected from the group consisting of $Al_2O_3$, $ZrO_2$, $SiO_2$, MgO and $Cr_2O_3$;

wherein said nitride is selected from the group consisting of $Si_3N4$ and BN; wherein said neutron absorber is selected from the group consisting of $B_4C$ and $B_2O_3$;

wherein a content of said neutron absorber is 1% by weight or more to 20% by weight or less, and wherein a mean particle size of said third particle in gaid aluminum matrix is 0.01 $\mu$m or more to 10 $\mu$m or less.

9. The aluminum composite material according to claim 8, wherein a mean particle size of said neutron absorber powder to be added is 0.01 $\mu$m or more to 100 $\mu$m or less.

* * * * *